United States Patent [19]

Hiraoka et al.

[11] Patent Number: 4,474,634
[45] Date of Patent: Oct. 2, 1984

[54] PROCESS FOR PRODUCING A LAMINATED FILM OR SHEET STRUCTURE

[75] Inventors: Takayuki Hiraoka, Wagi; Kenji Fujiyoshi, Tokyo, both of Japan

[73] Assignee: Mitsui Petrochemical Industries, Ltd., Tokyo, Japan

[21] Appl. No.: 366,330

[22] Filed: Apr. 7, 1982

Related U.S. Application Data

[60] Continuation of Ser. No. 181,960, Aug. 28, 1980, abandoned, which is a division of Ser. No. 71,067, Aug. 30, 1979, Pat. No. 4,279,957.

[30] Foreign Application Priority Data

Aug. 31, 1978 [JP] Japan ................................. 53-105636

[51] Int. Cl.$^3$ .............................................. B29D 23/04
[52] U.S. Cl. ........................... 156/244.13; 156/244.14; 156/244.24
[58] Field of Search ............... 156/244.13, 244.14, 156/244.24; 264/172, 173, 209, 514, 565; 425/133.1, 326.1; 428/212, 423.1, 424.2, 424.4, 910

[56] References Cited

U.S. PATENT DOCUMENTS

| | | | |
|---|---|---|---|
| 3,342,657 | 9/1967 | Dyer | 156/244.14 |
| 3,471,353 | 10/1969 | Rasmussen | 156/322 |
| 3,508,944 | 4/1970 | Henderson et al. | 264/173 |
| 3,853,661 | 12/1974 | Sudo | 156/244.14 |
| 3,891,374 | 6/1975 | Ninomiya et al. | 425/326.1 |
| 3,894,907 | 7/1975 | Sudo | 425/133.1 |
| 3,983,285 | 9/1976 | Riboulet et al. | 428/212 |
| 4,009,975 | 3/1977 | Ninomiya et al. | 425/72 R |
| 4,011,128 | 3/1977 | Suzuki | 156/244.13 |
| 4,084,028 | 4/1978 | Rasmussen | 428/297 |

Primary Examiner—Caleb Weston
Attorney, Agent, or Firm—Sherman & Shalloway

[57] ABSTRACT

A laminated film or sheet structure composed of (i) an adhesive layer (A), (ii) synthetic resin film layers ($B_1$) and ($B_2$) monoaxially oriented in a direction oblique to the longitudinal direction of the film, said layers ($B_1$) and ($B_2$) being located on both surfaces of said layer (A) in contact therewith, the directions of the orientations of said layers ($B_1$) and ($B_2$) crossing each other, and (iii) a substantially non-oriented synthetic resin film layer ($C_1$) and/or a substantially non-oriented synthetic resin film layer ($C_2$), said layers ($C_1$) and/or ($C_2$) being melt-adhered to both or one of said layers ($B_1$) and ($B_2$), said layers ($C_o$) and/or ($C_2$) having a lower orientation temperature than said layers ($B_1$) and ($B_2$); and a process for production thereof.

6 Claims, 7 Drawing Figures

PROCESS FOR PRODUCING A LAMINATED FILM OR SHEET STRUCTURE

This is a continuation of application Ser. No. 181,960, filed Aug. 28, 1980, abandoned, which is a division of application Ser. No. 071,067, filed Aug. 30, 1979, now Pat. No. 4,279,957.

This invention relates to a laminated film or sheet structure which has an improved balance between strengths in the longitudinal and transverse directions, superior physical strengths such as tensile strength, tear strength and delamination strength, and superior heat sealing properties and high heat seal strength and which is easy to produce, and to a process for production thereof utilizing a known theory of imparting helical orientation to a tubular film.

A theory of producing a plastic film which is monoaxially oriented in a direction oblique to the longitudinal direction thereof has previously been known, and many methods and apparatuses based on the utilization of this theory have been suggested. Also known are a laminated film or sheet structure obtained by laminating films prepared in this manner so that the orientation directions cross each other to provide a good balance between the strengths in the longitudinal and transverse directions, and a method for its production.

Two types of method are known for producing a plastic film which is monoaxially oriented in the oblique direction.

According to one type as suggested, for example, in U.S. Pat. No. 3,342,657 (corresponding to British Pat. No. 1,071,085), a laminated film or sheet structure having a good balance between strengths in the longitudinal and transverse directions is obtained by melt-extruding a tubular film of a synthetic resin, monoaxially orienting it in the extruding direction (longitudinal direction), slitting the monoaxially oriented tubular film into two strips along the helical lines of the tubular film, and laminating the resulting two obliquely monoaxially oriented strips so that the orientation directions of the two strips cross each other.

According to the other type as suggested, for example, in British Pat. No. 1,414,785, and U.S. Pat. Nos. 3,891,374 and 4,009,975, a laminated film or sheet structure having a good balance between strengths in the longitudinal and transverse directions is provided by melt-extruding a tubular film of a synthetic resin, imparting a motion capable of inducing helical orientation in the tubular film to thereby cause monoaxial orientation in the tubular film in a direction oblique to the extruding direction, slitting the helically oriented tubular film into two strips along the extruding direction, and then laminating the two obliquely monoaxially oriented strips so that the orientation directions of the strips cross each other.

To form a film which is monoaxially oriented in an oblique direction by the former type of method, slitting must be done along the helical lines of the longitudinally oriented tubular film, and the method suffers from many troubles in operation and equipment. Thus, the latter type of method is advantageous as a commercial method. The present invention pertains to a laminated film or sheet structure obtained by utilizing the theory of the latter type, and to a process for its production.

The laminated film or sheet structures obtained by these two types of methods have poor heat sealability because their outside surface layers are oriented substantially fully. Accordingly, from such a structure, packaging or container bags which can be used to include articles of a relatively large weight such as cement, fertilizers, feeds and salt cannot be produced by a commercially advantageous heat-sealing procedure. Accordingly, such bags have to be produced by using hotmelt adhesives or by sewing on a sewing machine, and the complexity of operation and the high cost of production cannot be avoided.

To remove such a defect, feasible heat-sealability may be imparted to the aforesaid laminated film or sheet structure by laminating a resin having good heat sealability through melt-extrusion onto the surface of the aforesaid film having monoaxial orientation in the oblique direction or the laminated film or sheet structure thereof. However, this causes another defect in that the melt-adhesion of the heat-sealable resin layer to the solidified film or its laminated structure becomes insufficient, and delamination cannot be avoided.

The laminated film or sheet structure of the prior art is made from one kind of resin in order to secure a good balance of strength. Such a structure may, for example, have good scratch resistance but poor impact strength, or have good oil resistance but poor water resistance, and is very much limited in its application.

The present inventors made investigations in order to overcome the aforesaid defects or disadvantages in the conventional laminated film or sheet structure composed of film strips which are monoaxially oriented in the oblique direction.

These investigations have led to the discovery that a tubular film of a synthetic resin composed of two melt-adhered layers with the outside layer film having a lower orientation temperature than the inside layer film can be easily produced by forming through melt-extrusion a two-layer tubular film of a synthetic resin composed of two layers arranged concentrically in a spaced-apart relationship and having different orientation temperatures from each other, the outside layer film having a lower orientation temperature than the inside layer film, and melt-adhering the opposing surfaces of the inside and outside layers at a temperature at which the two layers of tubular film can be melt-adhered to each other; or by forming through melt-extrusion a tubular film composed of two layers of tubular synthetic resin film melt-adhered and arranged concentrically and having different orientation temperatures from each other, the outside film layer having a lower orientation temperature than the inside layer film; and that a laminated tubular film composed of firmly melt-adhered outside surface layer and inside layer with the outside surface layer being substantially non-oriented and the inside layer having a helical orientation can be provided by imparting a motion capable of inducing the helical orientation to the melt-laminated tubular film composed of two melt-adhered film layers with the outside surface layer having a lower orientation temperature than the inside layer, at a temperature which is within the range of the orientation temperature of the inside layer but is outside the range of the orientation temperature of the outside surface layer.

It has also been found that a laminated film or sheet structure having an improved balance between strengths in the longitudinal and transverse directions, superior physical strengths such as tensile strength, tear strength and delamination strength, superior heat sealing properties and high heat seal strength can be obtained easily with commercial advantage by bonding with an adhesive the opposing surfaces of the inside layer film of the aforesaid melt-laminated tubular film so that the directions of the monoaxial orientation in a direction oblique to the longitudinal direction of the film resulting from the helical orientation cross each other, while or after taking up the melt-laminated tubular films in the flattened state with or without subsequent slitting in the extruding direction.

It is an object of this invention therefore to provide a laminated film or sheet structure free from the defects of the prior art and having various improved properties, and a process for production thereof.

The above and other objects and advantages of this invention will become more apparent from the following description.

According to this invention, there is provided a laminated film or sheet structure composed of (i) an adhesive layer (A), (ii) synthetic resin film layers $(B_1)$ and $(B_2)$ monoaxially oriented in a direction oblique to the longitudinal direction of the film, said layers $(B_1)$ and $(B_2)$ being located on both surfaces of said layer (A) in contact therewith, the directions of the orientations of said layers $(B_1)$ and $(B_2)$ crossing each other, and (iii) a substantially non-oriented synthetic resin film layer $(C_1)$ and/or a substantially non-oriented synthetic resin film layer $(C_2)$, said layers $(C_1)$ and/or $(C_2)$ being melt-adhered to both or one of said layers $(B_1)$ and $(B_2)$, said layers $(C_1)$ and/or $(C_2)$ having lower orientation temperatures than said layers $(B_1)$ and $(B_2)$.

Several embodiments of the structure of this invention are shown in FIG. 1—1, FIG. 1—2, FIG. 2—1 and FIG. 2—2.

FIGS. 1—1 and 2—1 are partial perspective views of some embodiments of the laminated film or sheet structure of this invention, and FIGS. 1—2 and 2—2 are views showing the relative positions of the individual layers of the structures shown in FIGS. 1—1 and 2—1.

Figure 12:
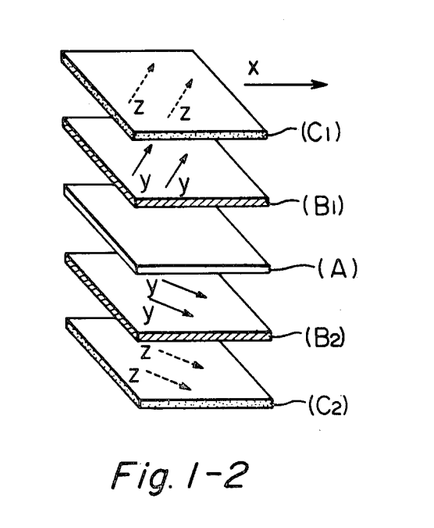
Figure 21:
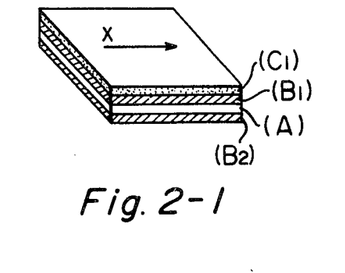
Figure 22:
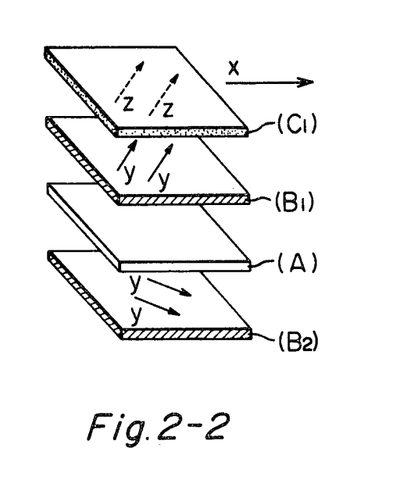

In these drawings, synthetic resin film layers $(B_1)$ and $(B_2)$ which are monoaxially oriented in a direction oblique (the directions shown by arrow y in FIGS. 1—2 and 2—2) to the longitudinal direction (the direction shown by arrow x in FIGS. 1—2 and 2—2) of the film are located on both surfaces of an adhesive layer (A) and are bonded to each other through the adhesive layer (A). As is well shown in FIGS. 1—2 and 2—2, the directions of orientation of the layers $(B_1)$ and $(B_2)$ cross each other.

The laminated sheet or film structure of the invention further includes substantially non-oriented synthetic resin film layers $(C_1)$ and $(C_2)$ (FIGS. 1—1 and 1—2) or a substantially non-oriented synthetic resin film layer $(C_1)$ (FIGS. 2—1 and 2—2) which are or is firmly melt-adhered to the surfaces of the layers $(B_1)$ and $(B_2)$ (FIGS. 1—1 and 1—2) or to the surface of the layer $(B_1)$ (FIGS. 2—1 and 2—2). In the embodiment shown in FIGS. 2—1 and 2—2, layer $(C_2)$ may be adhered to layer $(B_2)$ instead of the layer $(C_1)$.

In FIGS. 1—2 and 2—2, the directions shown by broken-line arrows in layers $(C_1)$ and/or $(C_2)$ show the directions of a motion which is imparted to the layer $(C_1)$ and/or $(C_2)$ so as to induce a helical orientation in the melt-laminated tubular film in the production of a laminated film or sheet structure by the process of this invention. In the present invention, the orientation temperatures of the layers $(C_1)$ and $(C_2)$ are lower than those of the layers $(B_1)$ and $(B_2)$. Since the aforesaid motion which will induce a helical orientation is imparted under such temperature conditions that the layers $(B_1)$ and $(B_2)$ are within the range of their orientation temperatures and the layers $(C_1)$ and $(C_2)$ are outside the range of their orientation temperatures (higher temperatures than the orientation temperatures), the motion is imparted in the directions shown by the arrows, but the layers $(C_1)$ and $(C_2)$ are not substantially oriented.

The synthetic resin which forms the layers $(B_1)$ and $(B_2)$ may be a film-forming synthetic resin, preferably a thermoplastic synthetic resin from which a film can be formed by an inflation method. Specific examples of such resins are homopolymers and copolymers of alpha-olefins having 2 to 10 carbon atoms such as ethylene, propylene, butene and decene, copolymers of at least one such alpha-olefin with a diene, modified products of these alpha-olefin polymers or copolymers such as those modified with an unsaturated acid (e.g., maleic anhydride) or an epoxy compound, and blends of these alpha-olefin polymers of copolymers. There can also be cited styrene polymer, styrene copolymers, vinyl chloride polymer, vinyl chloride copolymers, polyalkylene terephthalates such as polyethylene terphthalate and polybutylene terephthalate, polyamides, polycarbonates, blends of these with one another, and blends of these with the aforesaid alpha-olefin resins. These film-forming synthetic resins are selected so that their orientation temperatures are higher than the orientation temperatures of resins selected for the formation of the layers $(C_1)$ and $(C_2)$. Preferably, the degrees of the orientations of the layers $(B_1)$ and $(B_2)$ are almost equal to each other.

Synthetic resins forming the layers $(C_1)$ and $(C_2)$ are film-forming synthetic resins having a lower orientation temperature than the resins which form the layers $(B_1)$ and $(B_2)$. It is especially preferable to select resins which can form layers $(C_1)$ and/or $(C_2)$ having good heat sealability. To this end, the resins for forming the layers $(C_1)$ and $(C_2)$ should preferably be those which have a lower melting point than the resins forming the layers $(B_1)$ and $(B_2)$. More preferably, resins having a melting point at least about 20° C. lower than the melting point of the resin forming the layers $(B_1)$ and $(B_2)$ should be selected. Especially preferably, the resins forming the layers $(C_1)$ and/or $(C_2)$ should have a melting point about 20° to about 80° C. lower than the melting point of the resins constituting the layers $(B_1)$ and $(B_2)$. It is preferred further that the resin which forms the layers $(B_1)$ and $(B_2)$ should be different in kind from the resin constituting the layers $(C_1)$ and $(C_2)$. The resin forming the layers $(C_1)$ and $(C_2)$ can be properly chosen depending upon the type of the resin forming the layers $(B_1)$ and $(B_2)$, the utility of the resulting laminated film or sheet structure, etc.

Examples of the resin for the formation of layers $(C_1)$ and $(C_2)$ are low-density polyethylene, an ethylene/vinyl acetate copolymer, and copolymers of ethylene with alpha-olefins having 3 to 10 carbon atoms.

A thermoplastic synthetic resin adhesive is preferred as the adhesive which constitutes the adhesive layer (A). Suitable adhesives are those having a lower melting point than the resin forming the layers $(B_1)$ and $(B_2)$. For example, adhesives having a melting point about 10° to about 80° C. lower than the melting point of the resin forming the layers $(B_1)$ and $(B_2)$ are preferred.

When the resin used to form the layers $(B_1)$ and $(B_2)$ is high-density polyethylene or polypropylene, low-density polyethylene, an ethylene/vinyl acetate copolymer or an ethylene/acrylate ester copolymer is preferred as the resin for forming the adhesive layer (A). Equally usable are synthetic rubbers such as ethylene-propylene rubber, ethylene-propylene-diene rubber, styrene-butadiene rubber, polybutadiene, chloroprene rubber, chlorinated polyethylene, and polyisobutylene and mixtures of these, and thermosetting-type adhesives such as isocyanate-type adhesive and polyurethane-type adhesives.

The aforesaid laminated film or sheet structure of this invention can be produced by using any method and an apparatus which induce helical orientation in a melt-laminated tubular film utilizing the known theory of imparting helical orientation to tubular films.

The melt-laminated tubular film is prepared preferably by (1) forming a two-layer tubular film of synthetic resin composed of two layers which are concentrically arranged in a spaced-apart relationship and having different orientation temperatures from each other through melt extrusion, the outside layer film of the tubular film having a lower orientation temperature than the inside layer film, and (2) melt-adhering the opposing surfaces of the inside and outside layers at a temperature at which the tubular films of the two layers can be melt-adhered to each other. Alternatively, it can be formed by utilizing a known melt-extrusion nozzle capable of extruding the starting resins into the form of the aforesaid melt-laminated tubular film, and forming a tubular film composed of two layers of a synthetic resin tubular films melt-adhered and concentrically arranged and having different orientation temperatures from each other, the outside layer film in the tubular film having a lower orientation temperature than the inside layer film.

According to this invention, the desired laminated film or sheet structure can be produced by subjecting the melt-laminated tubular film composed of synthetic resin tubular film layers ($B_1$) and ($B_2$) as an inside layer and tubular film layers ($C_1$) and/or ($C_2$) as an outside surface layer to the following steps.

(3) A motion capable of inducing helical orientation is imparted to the melt-laminated tubular film by utilizing a known means of imparting helical orientation to tubular films, at a temperature which is within the range of the orientation temperature of the inside layer but is outside the range of the orientation temperature of the outside layer; and (4) While or after taking up the resulting melt-laminated tubular films in the flattened state, the two opposing surfaces of the inside layer film are bonded to each other through an adhesive so that the directions of the monoaxial orientation in a direction oblique to the longitudinal direction of the film which is caused by the aforesaid helical orientation cross each other.

With reference to the accompanying drawings, one embodiment of this invention is described in detail below in which a melt-laminated tubular film composed of tubular film layers ($B_1$) and ($B_2$) as an inside layer and tubular film layers ($C_1$) and/or ($C_2$) as an outside surface layer is formed, and a motion capable of inducing helical orientation is imparted to the resulting melt-laminated tubular film.

Figure 3:
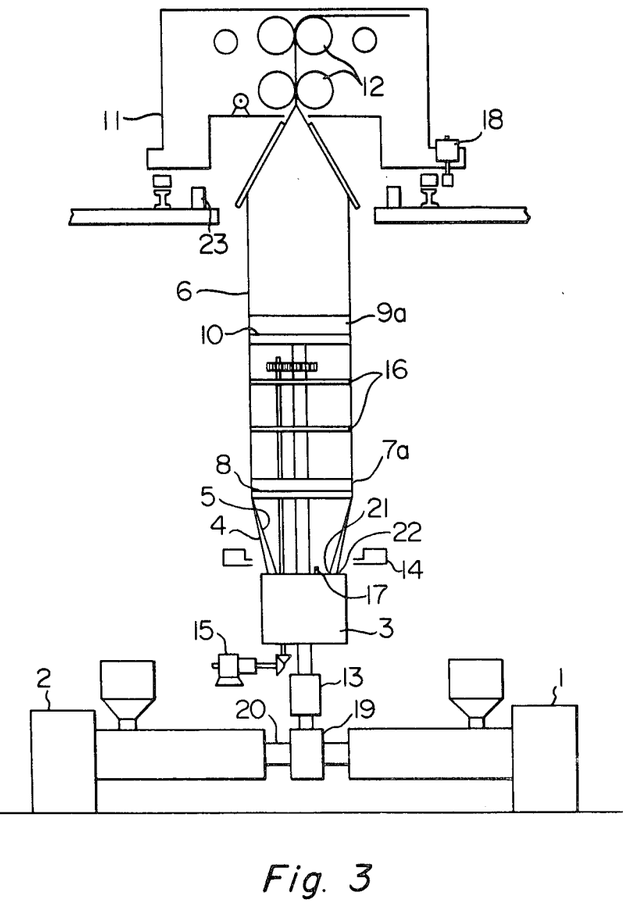
FIGS. 3 to 5 are partly perspective, schematic side elevations of apparatuses suitable for the practice of the above-mentioned embodiment.

In FIG. 3, the reference numeral 1 represents a first extruder; 2, a second extruder; 19 and 20, adapters; 3, a fixed multilayer annular die; and 21 and 22, annular slits. Flow paths are formed so that a resin for forming film layers ($B_1$) and ($B_2$) melted in the first extruder 1 is extruded from the inner annular slit 21 of the multilayer annular die 3, and a resin for forming film layers ($C_1$) and ($C_2$) melted in the second extruder 2 is extruded through the outer annular slit 22 of the die 3. The reference numeral 4 represents an outside layer tubular film; 5, an inside layer tubular film; and 6, a melt-laminated tubular film. A first mandrel 7a is fixed coaxially with and above the annular die 3, and a second mandrel is provided coaxially with and downstream of the first mandrel 7a. The second mandrel 9a is provided in such a manner that it is rotatable about the axis by a motor 15. Annular suction slits 8 and 10 are provided on the surfaces of the first mandrel 7a and the second mandrel 9a respectively, and are connected to a suitable pressure-reducing device located outside the apparatus. A circulating passageway for a cooling medium and/or a heat transfer medium is formed within the first mandrel 7a and the second mandrel 9a to adjust the temperatures of the mandrels. A turn table 11 is provided so that by a driving motor 18, it can be rotated coaxially and synchronously with the second mandrel 9a. Pulling rolls 12 are provided on the turn table 11 to pull the two-layer laminated tubular film 6 and deliver it to wind-up rolls in the subsequent step. An air opening 17 for inflating a tubular film extruded from the circular die is connected to a suitable air-introducing pipe not shown. An air ring 14 is provided to blow a cooling medium such as air through an annular slit (not shown) against the outside surface of the tubular film 6 to cool it. A loosening-preventing plate 16 is provided so that it can idly rotate independently of the first mandrel 7a and the second mandrel 9a.

Figure 4:
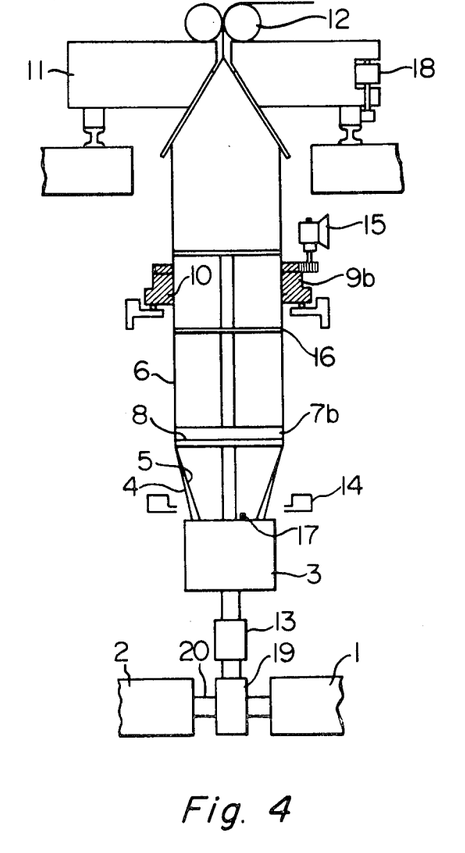
Figure 5:
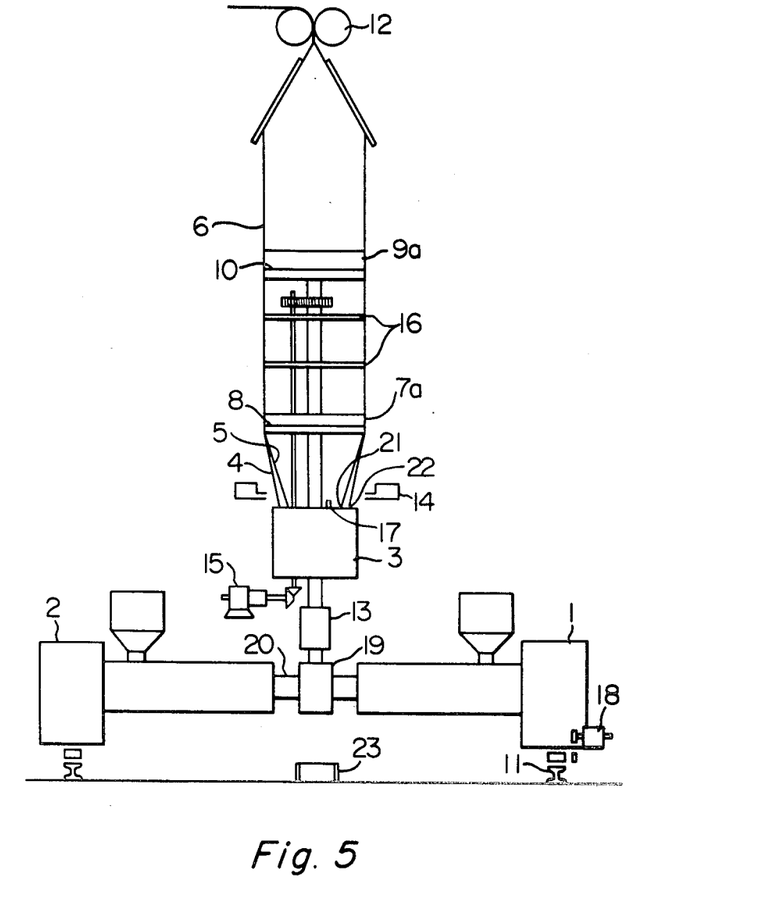
Figure 11:
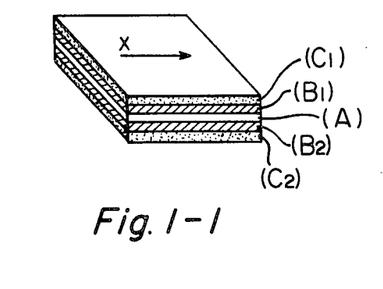

FIG. 4 shows a modification of the apparatus shown in FIG. 5 resulting from the use of an outside mantle 9b instead of the second mandrel 9a. The outside mantle 9b is located coaxially with, and downstream of, the mandrel 7a, and is adapted to rotate synchronously with the turn table 11 by the motor 15 about its axis. In the present invention, synchronous rotation denotes rotation in the same direction at the same rotational speed. Annular suction slit 10 is provided in the inside surface of the outside mantle 9b. The slit 10 is connected to a suitable pressure-reducing device (not shown) outside the apparatus.

FIG. 5 shows another modification of the apparatus shown in FIG. 3, in which the extruders 1 and 2 are rotated, and synchronously with the rotation of the extruders, the first mandrel 7a is rotated, and in the meantime, the second mandrel 9a and the pulling rolls 12 are stationary or are rotated in the reverse direction. Since the pulling rolls 12 are fixed, it is not necessary to provide a turntable. In the apparatus shown in FIG. 5, the two extruders are rotated. However, similar results can be obtained by fixing the extruders 1 and 2 and rotating (not shown) the multi-layer annular die 3.

Various modifications of the apparatus used in the process of this invention are possible so long as it includes at least two extruders, adapters, a multi-layer annular die, a first contacting tube guide, a second contacting tube guide and pulling rolls, and the annular die and the first contacting tube guide are synchronized, the second contacting tube guide and the pulling rolls are synchronized, and a relative rotation speed difference can be provided between the first and second contacting tube guides.

One example of the process of this invention are described below with reference to the drawings.

A synthetic resin for forming film layers ($B_1$) and ($B_2$) is melted in the first extruder 1, and fed into the multilayer annular die 3 via the adapter 19, and extruded as an inside layer annular film 5 from the inner annular slit 21. In the meantime, a synthetic resin for forming film layers ($C_1$) and/or ($C_2$) is melted in the second extruder 2, fed into the multi-layer annular die 3 via the adapter 20, and extruded as outside layer annular film 4 from the outside annular slit 22. The technique and apparatus for co-extruding at least two synthetic resins in the molten state to melt-adhere the opposing surfaces of both and to form a melt-laminated tubular film 6 is known, for example, from Modern Plastics, 46, 128 (January 1969), and Japanese Patent Publication No. 13628/66.

Although FIGS. 3, 4 and 5 illustrate embodiments of extruding a two-layer laminate film using extruders, a technique of extruding a laminate film composed of three or more layers using three or more extruders, and a technique of extruding a laminate film composed of three or more layers using two extruders are also embodiments of the process of this invention.

In FIGS. 3 to 5, the multilayer annular die 3 has the inner annular slit 21 and the outer annular slit 22. Instead of such a die, there may also be used a die having an annular flow passage for a synthetic resin forming the layers ($B_1$) and ($B_2$) and an annular flow passage for a synthetic resin forming layers ($C_1$) and ($C_2$) so that the streams of these resins are extruded from one annular slit. By constructing the outer annular slit 22 in a semicircular configuration, a laminated tubular film of the type shown in FIGS. 2—1 and 2—2 can be extruded.

The extruded melt-laminated tubular film 6 is inflated by the air blown from the air opening 17, and then cooled and solidified while being in contact with the first contacting tube guide, after which it moves downstream. When cooling of the multilayer tubular film 6 is insufficient owing to the increase of the speed of molding, air ring 14 may be provided to blow a cooling medium, especially air, against the outside surface of the melt-laminated tubular film 6.

In the present invention, the contacting tube guide denotes a means for cooling or heating the tubular film 6 by permitting sliding movement of the film in contact therewith, which corresponds to the mandrels 7a and 9a in FIGS. 3 and 5, and to the mandrel 7a and the outside mantle 9b in FIG. 4. Annular suction slits 8 and 10 are provided on these contacting tube guides, and at these portions, the film 6 is brought into intimate contact with the inside peripheral surface of the contacting tube guides by the suction force applied from a vacuum source. This suction force can be varied by changing the degree of vacuum. Desirably, the degree of vacuum is adjusted so that the frictional force between the inner peripheral surfaces of the contacting tube guides and the film 6 is of such a magnitude as to impart helical orientation to the film 6 and meanwhile, to permit movement of the film 6 toward the take-up side.

The melt-laminated tubular film which has moved past the first contacting tube guide contacts the periphery of the annular loosening-preventing plate 16. Provision of the loosening-preventing plate 16 is preferred in order to obtain a uniform film. The plate 16 makes intimate contact with the inside surface of the film 6 and idly rotates according to the movement of the film 6.

The melt-laminated tubular film 6 which has further moved downstream makes intimate contact with the peripheral surface of the second contacting tube guide.

According to the process of this invention, helical orientation is imparted to one layer of the melt-laminated tubular film 6 by the relative rotation which occurs between the first contacting tube guide and the second contacting tube guide. Accordingly, the speed of this relative rotation has close relations with the direction of orientation imparted to one layer of the melt-laminated tubular film 6. Preferably, the direction of the orientation of the film is at an angle of 30° to 60° to the longitudinal direction of the film 6.

In the process of this invention, a motion capable of inducing helical orientation can be imparted in the aforesaid manner to the melt-laminated tubular film composed of synthetic resin tubular film layers ($B_1$) and ($B_2$) as an inside layer and tubular film layers ($C_1$) and/or ($C_2$) as an outside surface layer in which the outside surface layer has a lower orientation temperature than the inside film layer. At this time, the motion to induce helical orientation is imparted at a temperature which is within the range of the orientation temperature of the inside layer but is outside the range of the orientation temperature of the outside surface layer. For example, when as shown in FIG. 3, the first mandrel 7a is used as the first contacting tube guide and the second mandrel 9a as the second contacting tube guide (to be referred to as "method a"), the temperature of the innermost layers ($B_1$) and ($B_2$) of the melt-laminated tubular film 6 contacting the first and second mandrels between them is adjusted to temperatures within the range of the orientation temperatures of the synthetic resin forming these layers, usually between the melting point of the resin and its second order transition temperature, preferably between (melting point minus 3° C.) and (melting point minus 30° C.). As a result of the temperature of the layers ($B_1$) and ($B_2$) being within the range of the orientation temperatures, the innermost layers ($B_1$) and ($B_2$) of the melt-laminated tubular film 6 are helically oriented by the relative rotation which occurs between the two mandrels. On the other hand, the temperatures of the other layers ($C_1$) and/or ($C_2$) of the melt-laminated tubular film 6 are adjusted to temperatures outside the range of the orientation temperatures of the synthetic resin forming the other layer ($C_1$) and/or ($C_2$), usually higher temperatures than the orientation temperature, i.e. temperatures above the second order transition point of the synthetic resin forming layers ($C_1$) and/or ($C_2$), preferably temperatures above (melting point minus 30° C.).

Thus, there can be produced a laminated film or sheet structure composed of layers ($B_1$) and ($B_2$) of synthetic resin film monoaxially oriented in a direction oblique to the longitudinal direction of the film, and layers ($C_1$) and/or ($C_2$) of substantially non-oriented synthetic resin film melt-adhered to the surfaces of both layers ($B_1$) and ($B_2$) or to the surface of one of the layers ($B_1$) and ($B_2$).

When mandrel 7a is used as the first contacting tube guide and outer mantle 9b as the second contacting tube guide (to be referred to as "method b"), a similar laminated film or sheet structure can be produced by employing the same temperature conditions as in method a.

It is also possible to form a similar laminated film or sheet structure when the outside mantle 9b is used as the first contacting tube guide and the mandrel 7a as the second contacting tube guide (to be referred to as method c).

The laminated film or sheet structure of this invention composed of (i) layer (A), (ii) layers ($B_1$) and ($B_2$), and (iii) layers ($C_1$) and/or ($C_2$) can be obtained by bonding with an adhesive the opposing surfaces of the inside layer film so that the directions of the monoaxial orientation of the film in a direction oblique to the longitudinal direction thereof which is caused by the helical orientation cross each other, the bonding being performed while or after taking up the melt-laminated tubular film having helical orientation in the flattened state.

The bonding operation can be performed either before or after slitting the melt-laminated tubular film having helical orientation along the longitudinal direction of the tubular film.

For example, an adhesive supplied from a slit of the second mandrel 9a is coated on the inner surface of the tubular film 6. While being moderately expanded to avoid loosening or creases, the tubular film 6 is taken up in the flattened state by a pair of pulling rolls 12 provided on the turntable 11 which rotates synchronously with the second mandrel 9a, and simultaneously, the opposing surfaces of the inside layer film are bonded to each other through an adhesive. The laminated structure is sent to a windup section not shown. If desired, the end edges in the longitudinal direction of the resulting laminated structure may be cut off to form a final product.

When an adhesive is not coated on the inner surface of the melt-laminated tubular film 6 having helical orientation, the film 6 is flattened by a pair of pulling rolls 12, and then cut open by a slitter (not shown) into two laminated film strips. The two film strips are bonded by using an adhesive so that the directions of the monoaxial orientation of the two film strips in a direction oblique to the lengthwise direction of the film cross each other. For example, they are bonded by an extrusion lamination method or a dry lamination method to form the desired laminated film or sheet structure.

In the present invention, each of the synthetic resin layers ($B_1$) and ($B_2$) is not limited to a single layer, and it may consist of two or more layers.

Some examples of the laminated film or sheet structure of this invention are shown below.

| No. | Non-oriented layer ($C_1$) | Obliquely oriented layer ($B_1$) | Adhesive layer (A) | Obliquely oriented layer ($B_2$) | Non-oriented layer ($C_2$) |
|---|---|---|---|---|---|
| 1 | MVA | HDPE | LDPE | HDPE | EVA |
| 2 | Ethylene/4-methyl-1-pentene copolymer | PP | LDPE | PP | Ethylene/4-methyl-1-pentene copolymer |
| 3 | FVA | PP | Ethylene/4-methyl-1-pentene copolymer | PP | EVA |
| 4 | LDPE | HDPE | Hot-melt adhesive | HDPE | LDPE |

EVA: Ethylene/vinyl acetate copolymer
HDPE: High-density polyethylene
LDPE: Low-density polyethylene
PP: Polypropylene By selecting a high-melting synthetic resin having superior strength as the inside layer and a low-melting resin having heat sealability as the outside layer, a laminated film or sheet structure having superior tensile strength and tear strength, a good balance between strengths in the longitudinal and transverse directions, and good heat sealability can be obtained. Accordingly, it is very easy to produce bags from this laminated film or sheet structure by heat sealing, in contrast to the prior art which has relied upon the use of a hot-melt adhesive or sewing on a sewing machine, etc. in bag formation.

The following Examples illustrate the present invention in more detail.

EXAMPLE 1

Using an apparatus of the type shown in FIG. 3, a laminated film structure was formed which consisted of non-oriented layers ($C_1$) and ($C_2$) of low-density polyethylene, obliquely oriented layers ($B_1$) and ($B_2$) of high-density polyethylene, and an adhesive layer (A) of a polyurethane-type adhesive.

In the first extruder 1, high-density polyethylene (density 0.960 g/cm$^2$; MI 0.5 at 190° C.) for the formation of layers ($B_1$) and ($B_2$) was melted at 190° C., and fed into the multilayer annular die 3 via the adapter 19. The melt was extruded at a rate of 30 kg/hour as inside annular film 5 through the inner annular slit 21.

In the second extruder 2, low-density polyethylene (density 0.920 g/cm$^3$; MI 3.5 at 190° C.) for the formation of the layers ($C_1$) and ($C_2$) was melted at 190° C., and fed into the multilayer annular die 3 via the adapter 20. The melt was extruded at a rate of 10 kg/hour as the outside annular film 4 through the outer annular slit 22.

The extruded melt-laminated tubular film 6 was inflated by blowing air from the air opening 17, and then cooled and solidified while being in contact with the first contacting tube guide, followed by movement toward the downstream side.

By maintaining the temperature of the first contacting tube guide at 80° C., the temperature of the melt-laminated tubular film was adjusted such that the inside tubular film was at its orientation temperature, and the outside tubular film was outside the range of its orientation temperature.

The melt-laminated tubular film 6 which moved past the first contacting tube guide made intimate contact with the peripheral surface of the second contacting tube guide while being in contact with the annular loosening-preventing plate 16.

The melt-laminated tubular film 6 was given helical orientation by providing a relative rotation speed difference of 6 rpm between the first and second contacting tube guides.

A polyurethane-type adhesive was fed from a slit of the second contacting tube guide 9a, and coated on the inside surface of the melt-laminated tubular film 6. The coated tubular film was taken up in the flattened state at a rate of 10 meters/min. by a pair of pulling rolls 12 to obtain a laminated film structure in which the directions of the monoaxial orientation of the layers (B$_1$) and (B$_2$) in a direction oblique to the longitudinal direction of the film crossed each other at an angle of 90°.

The resulting laminated film structure had a good balance between tensile and tear strengths in the longitudinal and those in the transverse directions, superior impact strength and markedly improved delamination strength. It also had excellent heat sealing characteristics and high heat seal strength.

The properties of the laminated film structure were measured by the following methods, and the results are summarized in Table 1.

Tensile strength: ASTM D-882
Tear strength: ASTM D-1922
Peel strength between the inside and outside layers (delamination strength): ASTM D-903 (peeling speed 300 mm/min.)
Heat seal strength: JIS Z1521 (cellophane) Bag breaking test:
(1) Make a bag having a width of 560 mm and a length of 815 mm from the laminated film structure.
(2) Fill 25 kg of polyethylene pellets in the bag.
(3) Let the filled bag fall onto a concrete floor from a height of 1.4 meters.
(4) Determine the number of falling cycles which can be repeated until the bag breaks.

When the bag is not broken after ten cycles of the falling test, it is judged that the bag has very high strength. Conditions for heat sealing:
(1) Heat seal bar: 5 mm in width
(2) Heat sealing pressure: 2 kg/cm$^2$
(3) Heat sealing time: 1 second
(4) Heat sealing temperature: 110° C. to 200° C.

Heat sealing is performed at a temperature in the range of 110° to 200° C., and the heat seal strength is measured every time the heat sealing temperature increases by 10° C. within the above range. The maximum value of the measured heat strengths is defined as the heat seal strength of the sample.

EXAMPLE 2

Using an apparatus of the type shown in FIG. 3, a laminated film structure was formed which consisted of non-oriented layers (C$_1$) and (C$_2$) of ethylene/vinyl acetate copolymer, obliquely oriented layers (B$_1$) and (B$_2$) of high-density polyethylene, and an adhesive layer (A) of polyurethane-type adhesive.

In the first extruder 1, high-density polyethylene (density 0.960 g/cm$^3$; MI 0.5 at 190° C.) for the formation of the film layers (B$_1$) and (B$_2$) was melted at 180° C., and fed into the multilayer annular die 3 via the adapter 19. The melt was extruded at a rate of 30 kg/hour as the inside layer tubular film 5 through the inner annular slit 21.

In the second extruder 2, ethylene/vinyl acetate copolymer (density 0.940 g/cm$^3$; MI 2.0 at 190° C.) for the formation of the layers (C$_1$) and (C$_2$) was melted at 180° C., and fed into the multilayer annuar die 3 via the adapter 20. The melt was extruded at a rate of 10 kg/hour as the outside tubular film 4 through the outer annular slit 22.

The extruded melt-laminated tubular film 6 was inflated by blowing the air from the air opening 17, and cooled and solidified while being in contact with the first contacting tube guide, followed by movement toward the donwstream side.

By maintaining the temperature of the first contacting tube guide at 70° C., the temperature of the melt-laminated tubular film 6 was adjusted such that the inside tubular film was at its orientation temperature, and the outside tubular film was outside the range of its orientation temperature.

The melt-laminated tubular film 6 which moved past the first contacting tube guide made intimate contact with the peripheral surface of the second contacting tube guide while being in contact with the annular loosening-preventing plate 16.

The melt-laminated tubular film 6 was given helical orientation by providing a relative rotation speed difference of 6 rpm between the first and second contacting tube guides.

From a slit of the second contacting tube guide 9a, a polyurethane-type adhesive was fed, and coated on the inner inside surface of the melt-laminated tubular film. The coated tubular film was taken up in the flattened state at a rate of 10 meters per minute by a pair of pulling rolls 12 to a laminated film structure in which the directions of the monoaxial orientation of the layers (B$_1$) and (B$_2$) in a direction oblique to the longitudinal direction of the film crossed each other at an angle of 90°.

The resulting laminated film structure had a good balance between tensile and tear strengths in the longitudinal and transverse directions, superior impact strength and markedly improved delamination strength. It also had excellent heat sealing characteristics and high heat seal strength.

The properties of the laminated film structure were measured in the same way as in Example 1, and the results are summarized in Table 1.

EXAMPLE 3

Using an apparatus of the type shown in FIG. 5, a laminated film structure was formed which consisted of non-oriented layers (C$_1$) and (C$_2$) of ethylene/vinyl acetate copolymer, obliquely oriented layers (B$_1$) and (B$_2$) of polypropylene and an adhesive layer (A) a polyurethane-type adhesive.

In the first extruder 1, polypropylene (density 0.90 g/cm$^3$; MI 2.0 at 210° C.) for the formation of the layers (B$_1$) and (B$_2$) was melted at 210° C., and fed into the multilayer annular die 3 via the adapter 19. The melt was extruded at a rate of 25 kg/hour as the inside annular film 5 through the inner annular slit 21.

In the second extruder 2, ethylene/vinyl acetate copolymer (density 0.96 g/cm$^3$; MI 2.0 at 190° C.) was melted at 210° C., and fed into the multilayer annular die 3 through the adapter 20. The melt was extruded at a rate of 10 kg/hour as the outside annular film 4 through the outer annular slit 22.

The extruded melt-laminated tubular film 6 was expanded by blowing the air from the air opening 17, and cooled and solidified while being in contact with the first contacting tube guide, followed by movement toward the downstream side.

By maintaining the temperature of the first contacting tube guide at 80° C., the temperature of the melt-laminated tubular film was adjusted such that the inside tubular film was at its orientation temperature, and the outside tubular film was outside the range of its orientation temperature.

The melt-laminated tubular film 6 which moved past the first contacting tube guide made intimate contact with the peripheral surface of the second contacting tube guide while being in contact with the annular loosening-preventing plate 16.

The melt-laminated tubular film 6 was given helical orientation by providing a relative rotation speed difference of 6 rpm between the first and second contacting tube guides.

From a slit of the second contacting tube guide 9a, a polyurethane-type adhesive was fed, and coated on the inside surface of the melt-laminated tubular film, and the coated film was taken up in the flattened state at a rate of 10 meters/min. by a pair of pulling rolls to provide a laminated film structure in which the directions of the monoaxial orientation of the layers ($B_1$) and ($B_2$) in a direction oblique to the longitudinal direction of the film crossed each other at an angle of 90°.

The resulting laminated film structure had good balance between tensile and tear strengths in the longitudinal and transverse directions, superior impact strength and markedly improved delamination strength. It also had excellent heat sealing characteristics and high heat seal strength.

The properties of the laminated film structure were measured in the same way as in Example 1, and the results are summarized in Table 1.

What we claim is:

1. A process for producing a laminated film or sheet structure which comprises
    (1) forming by melt-extrusion two layers of synthetic resin tubular films arranged concentrically in a spaced-apart relationship and having different orientation temperatures from each other, the outside layer of film having a lower orientation temperature than the inside layer of film,
    (2) melt-adhering the interior surface of the outside layer and the exterior surface of the inside layer at a temperature at which the inside and outside tubular film layers are melt-adhered to each other,
    (3) imparting a motion capable of inducing helical orientation to the melt-laminated tubular film thus formed by means of two contacting tube guides having a relative rotational speed difference and an annular suction slit provided on each of the two contacting tube guides at a temperature which is within the range of the orientation temperature of the inside layer but is outside the range of the orientation temperature of the outside layer, and
    (4) while or after taking up the resulting melt-laminated tubular film in the flattened state, bonding the opposing interior surfaces of the inside layer through an adhesive to form a laminated film or sheet structure so that the directions of the monoaxial orientation of the film in a direction oblique to the longitudinal direction thereof which is caused by the helical orientation cross each other.

2. A process for producing a laminated film or sheet structure which comprises
    (1') forming by melt extrusion a melt-laminated tubular film composed of two layers of synthetic resin tubular films melt-adhered to each other and arranged concentrically and having different orientation temperature from each other, the outside layer of film having a lower orientation temperature than the inside layer of film,
    (2') imparting a motion capable of inducing helical orientation to the melt-laminated tubular film thus formed by means of two contacting tube guides having a relative rotational speed difference and an annular suction slit provided on each of the two contacting tube guides at a temperature which is within the range of the orientation temperature of the inside layer but is outside the range of the orientation temperature of the outside layer, and
    (3') while or after taking up the resulting melt-laminated tubular film in the flattened state, bonding the opposing interior surfaces of the inside layer through an adhesive to form a laminated film or sheet structure so that the directions of the monoaxial orientation in a direction oblique to the longitudinal direction of the film which is caused by the helical orientation cross each other.

3. The process of claim 1 wherein in step (3), the temperature of the inside layer is between the melting point and the second order transition temperature of the resin forming said inside layer and the temperature of the outside layer is above the second order transition point of the synthetic resin forming said outside layer.

4. The process of claim 3 wherein the inside layer has a temperature between (melting point of the resin forming said inside layer minus 3° C.) and (said melting point minus 30° C.), and the outside layer has a temperature above (melting point of the resin forming the outside layer minus 30° C.).

5. The process of claim 2 wherein in step (2'), the temperature of the inside layer is between the melting point and the second order transition temperature of the resin forming said inside layer and the temperature of the outside layer is above the second order transition point of the synthetic resin forming said outside layer.

6. The process of claim 5 wherein the inside layer has a temperature between (melting point of the resin forming said inside layer minus 3° C.) and (said melting point minus 30° C.), and the outside layer has a temperature above (melting point of the resin forming the outside layer minus 30° C.).

* * * * *